United States Patent
Uematsu et al.

(10) Patent No.: US 8,545,071 B2
(45) Date of Patent: Oct. 1, 2013

(54) DEVICE FOR VIEWING FRONT-LATERAL AREA OF VEHICLE

(75) Inventors: Hiroshi Uematsu, Wako (JP); Yuya Kishimoto, Wako (JP); Norio Mugikura, Wako (JP); Tomoaki Hosobe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 13/375,962

(22) PCT Filed: Apr. 20, 2010

(86) PCT No.: PCT/JP2010/056977
§ 371 (c)(1),
(2), (4) Date: Dec. 2, 2011

(87) PCT Pub. No.: WO2010/143473
PCT Pub. Date: Dec. 16, 2010

(65) Prior Publication Data
US 2012/0075879 A1  Mar. 29, 2012

(30) Foreign Application Priority Data

Jun. 9, 2009  (JP) .................................. 2009-138338
Jun. 9, 2009  (JP) .................................. 2009-138410

(51) Int. Cl.
*B60Q 1/26* (2006.01)
(52) U.S. Cl.
USPC ............................ 362/494; 359/838; 359/850
(58) Field of Classification Search
USPC .......................... 362/540, 494; 359/832, 850
See application file for complete search history.

(56) References Cited

U.S. PATENT DOCUMENTS

| 4,268,120 | A  | * | 5/1981 | Jitsumori ........................ 359/850 |
| 4,685,779 | A  | * | 8/1987 | Gonzalez ....................... 359/841 |
| 6,357,883 | B1 | * | 3/2002 | Strumolo et al. ............. 359/857 |
| 6,764,207 | B2 | * | 7/2004 | Abalos et al. ................. 362/494 |
| 7,237,913 | B2 | * | 7/2007 | Duroux et al. ................ 359/838 |
| 7,344,258 | B2 | * | 3/2008 | MacDougall ................. 359/509 |
| 2004/0120055 | A1 | * | 6/2004 | Suzuki et al. ................. 359/850 |

FOREIGN PATENT DOCUMENTS

| JP | 55-155645 | 11/1980 |
| JP | 63-49707 | 4/1988 |
| JP | 06-008773 | 1/1994 |
| JP | 3033516 | 11/1996 |
| JP | 3091018 | 10/2002 |
| JP | 2004-255915 | 9/2004 |
| JP | 2005-059822 | 3/2005 |

(Continued)

*Primary Examiner* — Ali Alavi
(74) *Attorney, Agent, or Firm* — Rankin, Hill & Clark LLP

(57) ABSTRACT

Provided is a device for viewing a front-lateral area of a vehicle. A front-lateral viewing device (16) comprises a mirror body (41) of a door mirror (21), a mirror housing (42), a first reflection mirror (22) which is provided in the mirror (42) and which reflects a desired range from a front area to a lateral area with respect to a side portion (55) of a vehicle body, and a second reflection mirror (23) which reflects light from the first reflection mirror (22) toward a vehicle occupant. The mirror housing (42) has a recess (111) where a front surface (108) is inwardly recessed. The first reflection mirror (22) is provided in the recess (111). A blinker (14) is provided at a position spaced from an outer end (95) of the first reflection mirror (22) at a predetermined distance.

17 Claims, 15 Drawing Sheets

(56) References Cited

FOREIGN PATENT DOCUMENTS

| JP | 2005-199844 | 7/2005 |
| JP | 2006-517489 | 7/2006 |
| JP | 2006-202689 | 8/2006 |
| JP | 2009-173246 | 8/2009 |

* cited by examiner

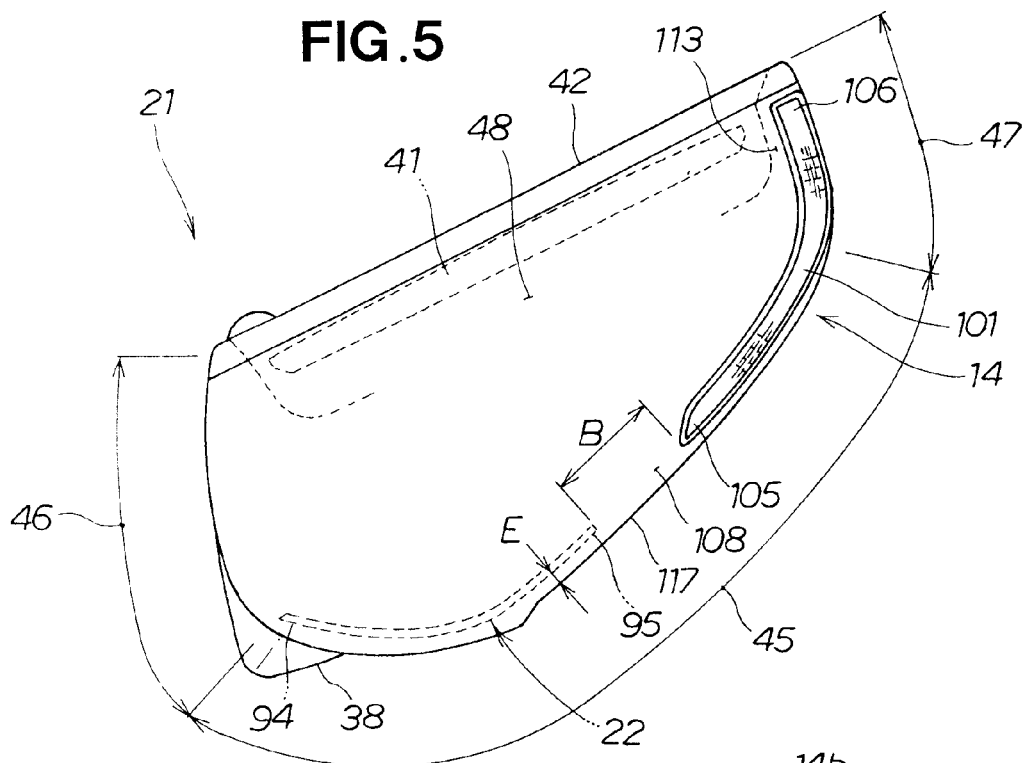
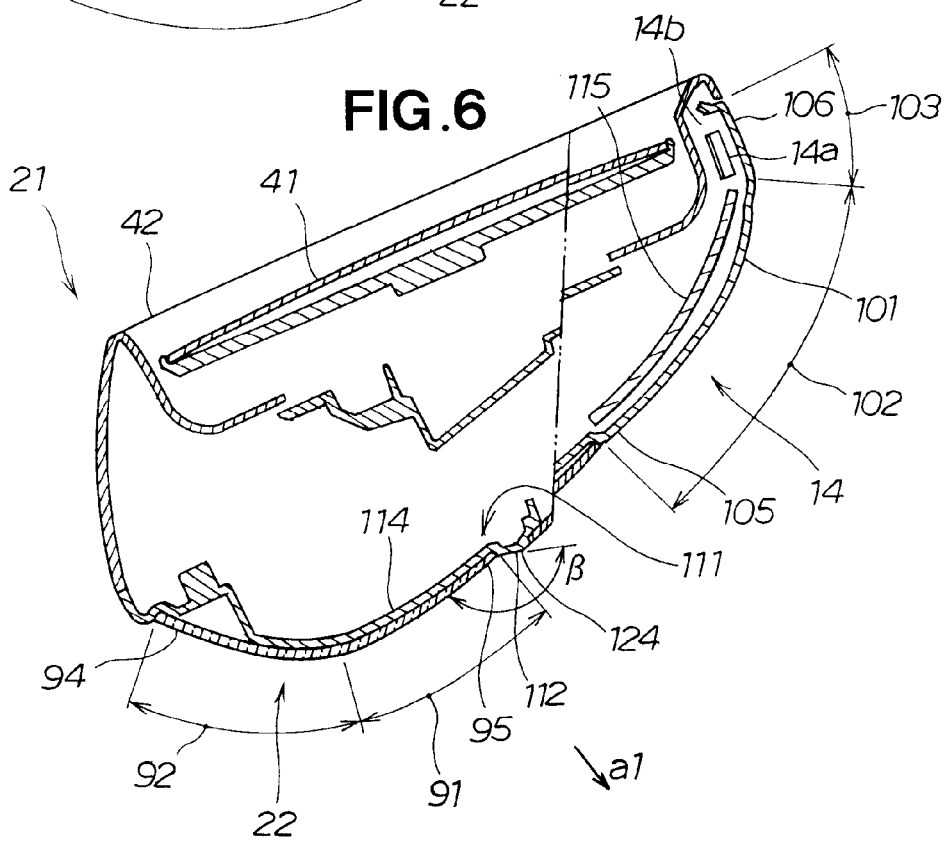

FIG.8
(a)
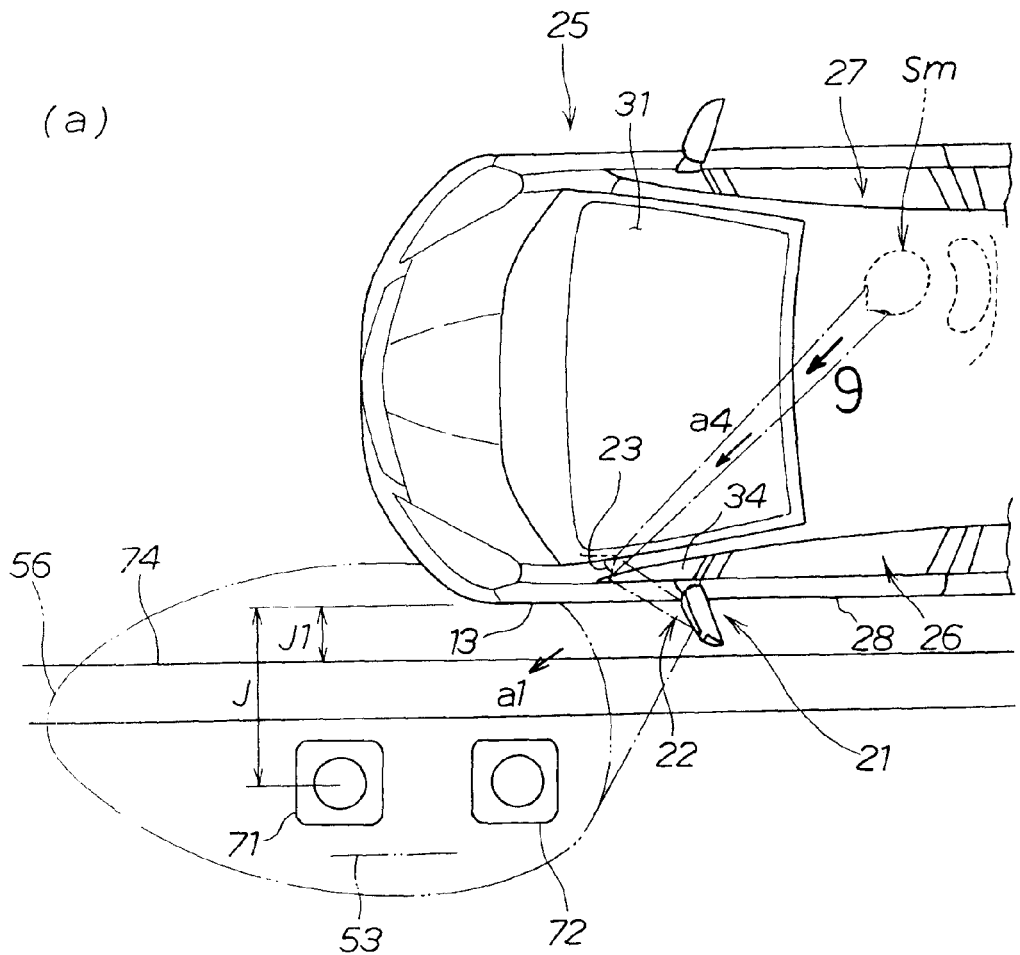
(b)
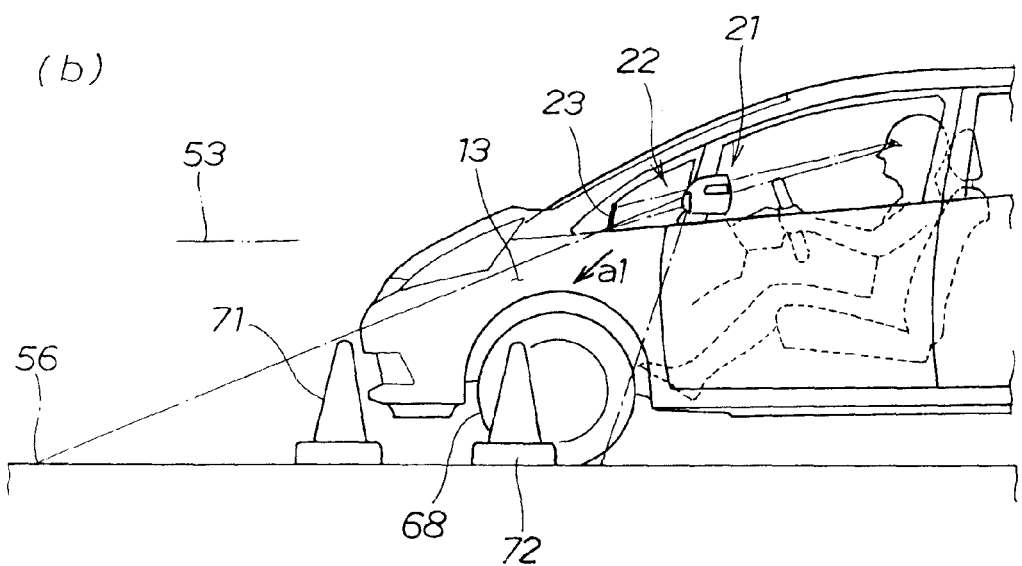

DEVICE FOR VIEWING FRONT-LATERAL AREA OF VEHICLE

TECHNICAL FIELD

The present invention relates to a device for viewing the periphery of a front wheel of a vehicle and a front-lateral area of the vehicle

BACKGROUND ART

Devices for viewing a front-lateral area of a vehicle include those which use mirrors and cameras. Viewing devices which use mirrors are disclosed in Patent Literature 1 and Patent Literature 2, for example. In the viewing device disclosed in Patent Literature 1, a first mirror which reflects a front-lateral area of a vehicle is provided to a sub pillar that forms a triangular window, images reflected in the first mirror are reflected toward a second mirror provided to a front pillar, and the images reflected in the second mirror can be seen by the driver. Therefore, the driver can view the front-lateral area of a vehicle via the second mirror.

However, with the viewing device according to Patent Literature 1, it is not possible to view the front body, the lateral area in the vicinity of the front body, or the vicinity near the front wheel. Furthermore, when a blinker is provided to the door mirror, the light emitted by the blinker reflects in the second mirror, making it difficult for the driver to see the images.

The viewing device proposed in Patent Literature 2 has a first mirror for reflecting a front-lateral area of a vehicle provided to a mirror housing which accommodates a mirror body, wherein images reflected in the first mirror are reflected toward a second mirror provided to the passenger compartment on the inside surface of a front pillar. The driver can see the front-lateral area of the vehicle reflected in the second mirror. A third mirror, which reflects the front-lateral area of the vehicle even when the door mirror is folded in, is also provided to the mirror housing.

However, with the viewing device according to Patent Literature 2, a blinker is provided to the door mirror, and when the functions of both the blinker and the side under mirror are enacted, they interfere with each other and become difficult to lay out, the light emitted by the blinker is reflected in the second mirror, making it difficult for the driver to see the images.

Furthermore, when the mirror housing comes in contact with something protruding into the road such as a tree branch, it could touch the first mirror as well, and the first mirror could be scratched or dirtied. It could similarly be scratched or dirtied when touched by a person or the handlebar of a bicycle in a parking lot. The possibility of being touched is particularly high when the door mirror is folded in.

Furthermore, it reflects sunlight from above and seems conspicuous. When the driver views the door mirror, a total of three mirrors: the door mirror, and the second and third mirrors inside the passenger compartment, enter the driver's field of vision, which seems troublesome and unsightly.

PRIOR ART LITERATURE

Patent Document

Patent Document 1: Japanese Patent Application Laid-Open Publication No. 2004-255915

Patent Document 2: Japanese Patent Application No. 2008-16636

SUMMARY OF INVENTION

Technical Problem

An object of the present invention is to provide a viewing device for a front-lateral area of a vehicle wherein reflection to a passenger is suppressed by preventing unnecessary light from the periphery from entering, the surface of a first mirror is protected from obstacles, and the light of the blinker is prevented from entering the first mirror.

Solution to Problem

According to a first aspect of the present invention, there is provided a device for viewing a front-lateral area of a vehicle, which front-lateral area viewing device comprises: a door mirror attached to a door which forms part of a side portion of a vehicle body; a first reflection mirror which is provided to the door mirror and which reflects a desired range from a front area to a lateral area with respect to a side portion of a vehicle body; and a second reflection mirror which reflects light from the first reflection mirror toward a vehicle occupant, wherein the door mirror has a mirror body and a mirror housing for accommodating and holding the mirror body, the mirror housing has a recess which is inwardly recessed, and the first reflection mirror is provided in the recess.

Preferably, the recess has a tapered wall part formed so as to widen in the direction in which the first reflection mirror reflects the desired range.

Preferably, the door mirror has a blinker which is disposed such that an inside end of the blinker is positioned farther to an outside than an outside end of the first reflection mirror, and which extends from a front surface to an outside surface of the mirror housing.

Preferably, the door mirror has a blinker which is disposed such that a bottom end of the blinker is positioned higher than a top end of the first reflection mirror, which extends from a front surface to an outside surface of the mirror housing.

Preferably, the blinker has a light-guiding plate which diminishes the amount of light when light passes through.

It is preferable that the blinker have a light source and the light-guiding plate, the light source be disposed in an end portion of the blinker, and the light-guiding plate be disposed so as to extend from the position where the light source is disposed toward an inner side of the mirror housing.

It is desirable that the first reflection mirror comprises a convex mirror and the recess be formed with a depth such that the first reflection mirror is positioned farther to the rear of the vehicle than a front end of the mirror housing.

Preferably, the mirror housing has a top curved portion formed to be curved from a center distal end to a top side portion and a bottom curved portion formed to be curved from the center distal end to a bottom portion, wherein the first reflection mirror is provided to the bottom curved portion.

Preferably, the tapered wall part has a chamfered portion formed in an edge.

According to another aspect of the present invention, there is provided a device for viewing a front-lateral area of a vehicle, which device comprises: a door mirror attached to a door which forms part of a side portion of a vehicle body; a first reflection mirror which is provided to the door mirror and which reflects a desired range from a front area to a lateral area with respect to a side portion of a vehicle body; and a second reflection mirror which reflects light from the first reflection mirror toward a vehicle occupant, wherein the first reflection mirror is provided so as to reflect at least part of the side portion of the vehicle body, and the side portion of the vehicle body has a blinker in a region outside the range reflected in the first reflection mirror.

According to another aspect of the present invention, there is provided a device for viewing a front-lateral area of a vehicle, which device comprises: a door mirror attached to a door which forms part of a side portion of a vehicle body; a first reflection mirror which is provided to the door mirror and which reflects a desired range from a front area to a lateral area with respect to a side portion of a vehicle body; and a second reflection mirror which reflects light from the first reflection mirror toward a vehicle occupant, wherein the first reflection mirror is provided so as to reflect at least part of the side portion of the vehicle body; and the side portion of the vehicle body has a blinker in a region inside the range reflected in the first reflection mirror, and shielding means for shielding light that is emitted from the blinker and directed toward the first reflection mirror.

Preferably, the shielding means comprises a light-blocking plate which extends along the blinker and which blocks light directed from the blinker toward the first reflection mirror.

Preferably, the side portion of the vehicle body includes a front fender while the shielding means includes: an open portion opening toward the rear of the vehicle in the front fender, and support means which connects to the open portion, is positioned in the inner side of the front fender, and supports the blinker.

Preferably, the blinker has a radiation angle of radiating light within a range of 15° upward and 15° downward relative to a horizontal line along the door while the shielding means is disposed in a position which does not interfere with the radiation angle.

Advantageous Effects of Invention

According to the front-lateral area viewing device of one aspect of the present invention, unnecessary light from the periphery of the first reflection mirror can be prevented from entering, and the reflection of unnecessary images to the vehicle occupant (the driver) can be suppressed.

Furthermore, when the door mirror comes in contact with an obstacle, the mirror housing comes in contact with the obstacle before the first reflection mirror fitted into the recess. Therefore, the surface of the first reflection mirror can be protected.

Furthermore, although the blinker is provided to the mirror housing, the light emitted from the blinker does not reach the first reflection mirror due to the recess. Therefore, the reflection of light from the blinker to the vehicle occupant (the driver) can be suppressed.

Since the recess has a tapered wall part formed in the direction in which light is reflected from the first reflection mirror, the tapered wall part is not reflected in the first reflection mirror.

Since the door mirror has a blinker disposed extending from the front surface of the mirror housing to the outside surface of the mirror housing so that the inside end of the blinker is positioned farther toward the outside than the outside end of the first reflection mirror, the blinker and the first reflection mirror do not interfere with each other's layout, and the light of the blinker can be prevented from entering the first reflection mirror.

Since the bottom end of the blinker is positioned higher than the top end of the first reflection mirror and the blinker is disposed so as to extend from the front surface of the mirror housing to the outside surface, the blinker and the first reflection mirror do not interfere with each other's layout, and the light of the blinker can be prevented from entering the first reflection mirror.

Since the blinker has a light-guiding plate which diminishes the amount of light that passes through, the light of the blinker is dimmed by the light-guiding plate, and the light can be prevented from entering the first reflection mirror. Furthermore, even if the light of the blinker reflects off the wall of a passageway or some other light-reflecting surface to be reflected by the first reflection mirror while the vehicle has stopped near the wall, the light is dim and is therefore less troublesome to the vehicle occupant.

By increasing the distance between the light source and the first reflection mirror, the light can be further prevented from entering the first reflection mirror, and the layout of the light source and the first reflection mirror do not mutually interfere with each other.

Since the recess formed in the mirror housing is formed with a predetermined depth, scratching of the surface of the first reflection mirror can be prevented.

Since the mirror housing has a top curved portion and a bottom curved portion and the first reflection mirror is provided to the bottom curved portion, light from oncoming car headlights and the like can be inhibited from reflecting off the second reflection mirror via the first reflection mirror.

Since the tapered wall part of the recess has a chamfered portion formed in the edge, the edge formed by the door mirror housing and the tapered wall part is not sharp, and light can be prevented from being reflected by a sharp edge.

According to another aspect of the present invention, since the blinker is provided to a region of the side portion of the vehicle body in a range where it will not reflect in the first reflection mirror, the light emitted from the blinker does not reach the first reflection mirror, and the light of the blinker does not reach the vehicle occupant's eyes via the first reflection mirror. Furthermore, there is no need for a member for blocking the light of the blinker, the number of components can be reduced, and the structure is simplified.

According to another aspect of the present invention, although the blinker is provided to a region of the side portion of the vehicle body in a range where it is reflected in the first reflection mirror, a shielding means is provided for blocking light directed to the first reflection mirror, the light of the blinker does not get in the vehicle occupant's eyes via the first reflection mirror. Thus, visibility in the desired range from the front area of the vehicle to the lateral area is improved even though the blinker is provided in a range where it is reflected in the first reflection mirror.

Furthermore, the target range for selecting the disposed position of the blinker is widened, and the degree of freedom in disposing the blinker is improved.

Since the shielding means is composed of a light-blocking plate which blocks light directed to the first reflection mirror from the blinker, the structure for blocking the light of the blinker directed to the first reflection mirror is a simple structure. Since the shielding means is composed of an open portion which opens toward the rear of the vehicle in the front fender, and support means which is disposed in the inner side of the front fender continuous with the open portion and which supports the blinker, the light of the blinker can be led to the open portion and light can be emitted from the open portion toward the rear of the blinker, but the light of the blinker emitted from the open portion does not reach the first reflection mirror.

Since the blinker has a radiation angle in which light is radiated within a range of 15° upward and 15° downward relative to a horizontal line along the door, and the shielding means is disposed in a position which does not interfere with the radiation angle, information can be reliably transmitted to following vehicles even through the light of the blinker directed to the first reflection mirror is blocked by the shielding means.

BRIEF DESCRIPTION OF DRAWINGS

FIG. 5 is a view of the mirror as seen in the direction of arrow 5 of FIG. 2;

FIG. 6 is a cross-sectional view taken along line 6-6 of FIG. 2;

FIG. 8 is a view showing how a front-lateral area of the vehicle is reflected with the front-lateral area viewing device;

DESCRIPTION OF EMBODIMENTS

First Embodiment

Figure 1:
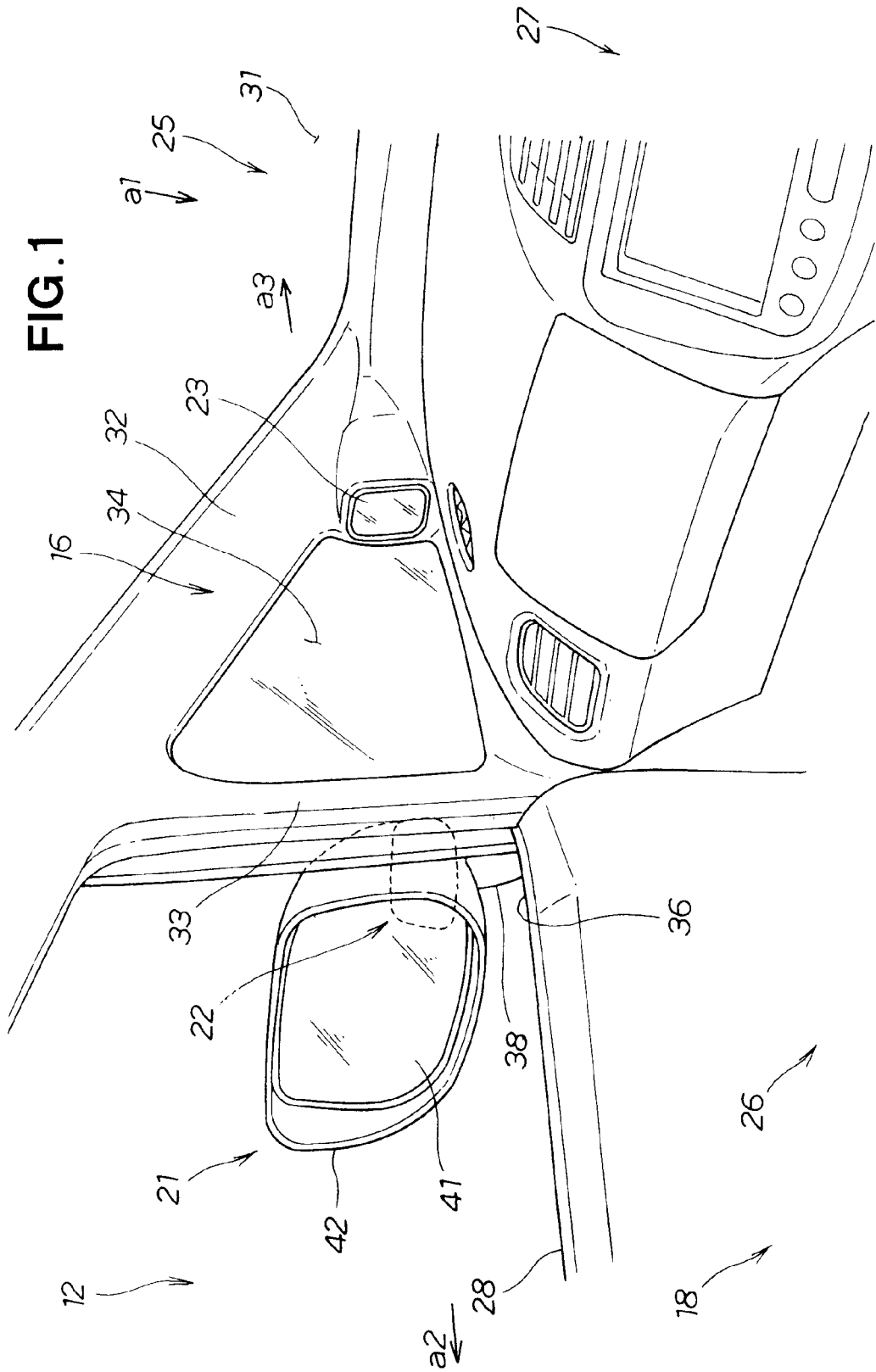
FIG. 1 is a perspective view illustrating a front-lateral area viewing device according to a first embodiment of the present invention.
Figure 2:
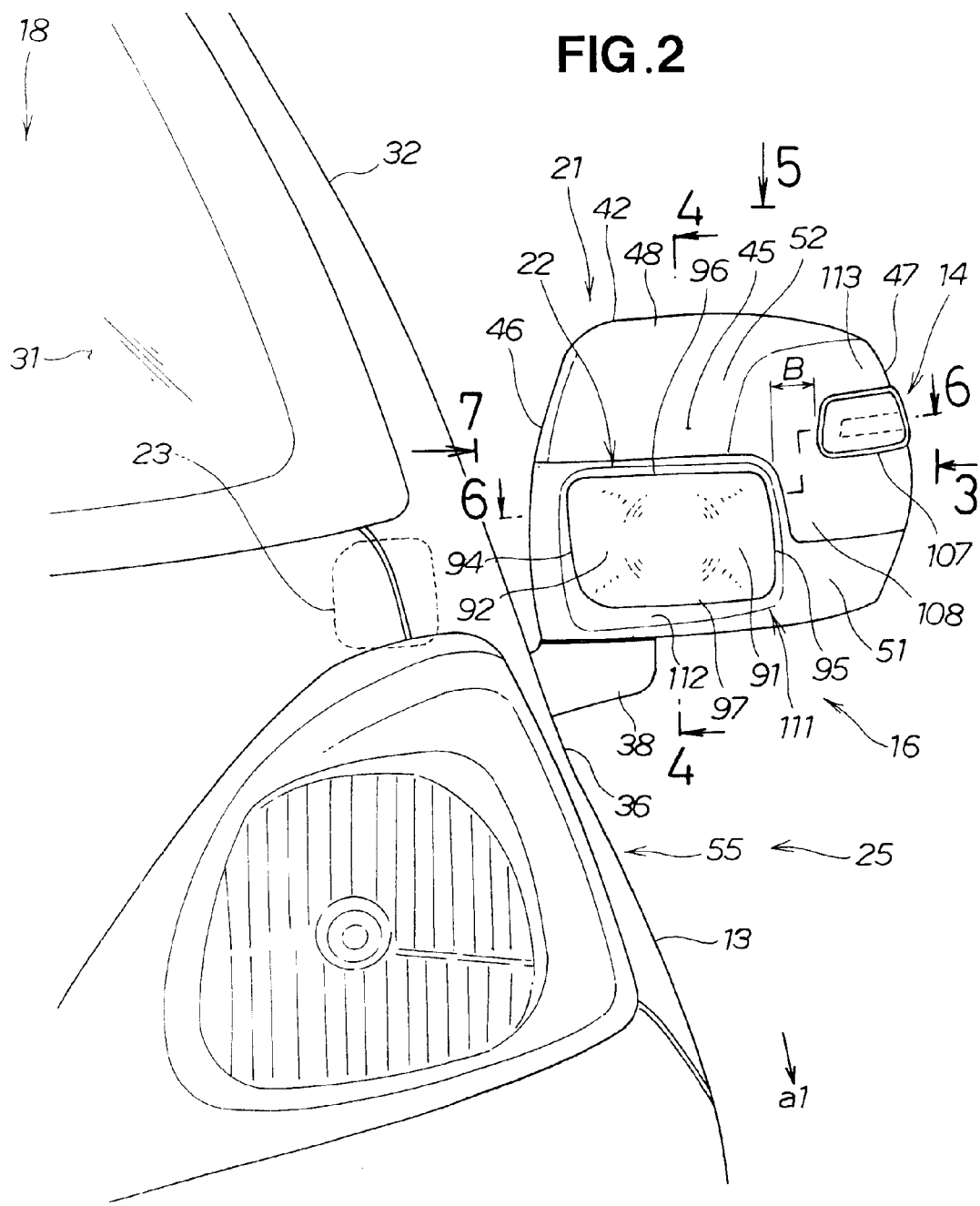
FIG. 2 is a front elevational view illustrating a door mirror of the front-lateral area viewing device of FIG. 1.

As shown in FIGS. 1 and 2, a vehicle 12 comprises a front pillars 32 for supporting the left and right ends of a windshield 31, a sub pillar 33 extending downward from the middle of the front pillar 32, a sub window glass 34 supported by the sub pillar 33 and the front pillar 32, and a front-lateral area viewing device 16 of a vehicle. The reference numeral 18 indicates a passenger compartment, 25 a front body, 26 a passenger seat, 27 a driver seat, and 28 a left front door.

The front-lateral area viewing device 16 according to the first embodiment is for viewing a lateral area to the left and in front of the vehicle 12 (the direction of arrow a1 in FIG. 8), wherein an image reflected in the first reflection mirror 22 provided to a door mirror 21 outside of the passenger compartment 18 is reflected toward a second reflection mirror 23 inside the passenger compartment 18, and the image reflected in the second reflection mirror 23 is seen by the driver. The door mirror 21 is provided with a blinker 14.

The door mirror 21, which is outside of the passenger compartment 18, comprises a support part 38 attached to a front top part 36 of the left front door 28, a mirror body 41 which reflects images of the rear of the vehicle (the direction of arrow a2), and a mirror housing 42 which supports and houses the mirror body 41.

The support part 38 rotatably supports the mirror housing 42 so that the mirror housing 42 can fold in toward the vehicle body side surface. The mirror housing 42, which is made of a resin and molded into a box shape, has a front surface part 45 facing toward the front of the vehicle 12 (in the direction of arrow a3), and an inner side part 46, outer side part 47, and upper side part 48 which are extensions of the front surface part 45. The first reflection mirror 22 is provided integrally to a bottom half part 51 of the front surface part 45. The reference numeral 52 indicates the top half part of the front surface part 45.

The first reflection mirror 22 is a convex mirror, and the radius and orientation of the convex surface are designed so that the lateral are to the left and front of the vehicle 12 (the lateral area visible limit position 53 of FIG. 8) reflects off the second reflection mirror 23. The second reflection mirror 23 is a flat mirror.

The first reflection mirror 22 has a curved shape which protrudes toward the front area of the vehicle as shown in FIG. 6, and the first reflection mirror 22 has a diagonally forward mirror part 91 facing the lateral area to the left front of the vehicle 12 (in the direction of arrow a1), and a forward mirror part 92 which is an extension of the diagonally forward mirror part 91 and which faces to the front area of the vehicle 12. The first reflection mirror 22 has an inside end part 94 at one end in proximity to the left front door 28, an outside end part 95 at the other end, one top end part 96 continuous with the inside end part 94 and the outside end part 95, and another bottom end part 97.

The blinker 14 comprises a light source 14a, and a lens 101 having a curved shape which protrudes toward the front area of the vehicle, as shown in FIGS. 2, 3, 5, and 6. The lens 101 has a diagonally forward radiation part 102 facing toward the lateral area to the left and front of the vehicle 12 (in the direction of arrow a1), and a laterally radiating part 103 as an extension of the diagonally forward radiation part 102. The lens 101 has at one end a lens inside end part 105 which is near the left front door 28 and which faces the front area of the vehicle 12, and at the other end a lens outside end part 106 and a lens bottom end part 107. A conventional device is used as the device for turning the blinker 14 on and off.

Next, the viewing device 16 according to the first embodiment is described in FIGS. 1 through 7.

The viewing device 16 comprises the mirror housing 42 of the door mirror 21 attached to a side portion 55 of the vehicle body (FIG. 2) which includes the left front door 28, the mirror body 41 which is housed and held in the mirror housing 42, the first reflection mirror 22 which is provided to a front surface 108 of the mirror housing 42 and which reflects a desired range of the lateral area (the lateral area visible limit position 53) from the front area (a front area visible limit position 56 in FIG. 8) of the side portion 55 of the vehicle body, and the second reflection mirror 23 which reflects light from the first reflection mirror 22 toward the vehicle occupant (the driver) Sm. The mirror housing 42 has a recess 111 where the front surface 108 is pressed inward. The first reflection mirror 22 is provided in this recess 111.

The recess 111 has a tapered wall part 112 which widens toward the range reflected from the first reflection mirror 22 (in the direction of arrow a1). The tapered wall part 112 is formed at an angle β (an obtuse angle) in relation to the first reflection mirror 22. The angle β (an obtuse angle) differs depending on its location.

The blinker 14 is disposed so that the lens inside end part (the inside end part) 105 is positioned farther outward than the outside end part 95 of the first reflection mirror 22 and the blinker 14 extends from the front surface 108 of the mirror housing 42 to a outside surface 113 of the mirror housing 42, as shown in FIG. 5. The outside end part 95 of the first reflection mirror 22 is positioned in the center of the front surface 108 of the mirror housing 42. The blinker 14 is disposed so that the lens inside end part 105 of the blinker 14 is separated by a distance B from the outside end part 95.

Figure 3:
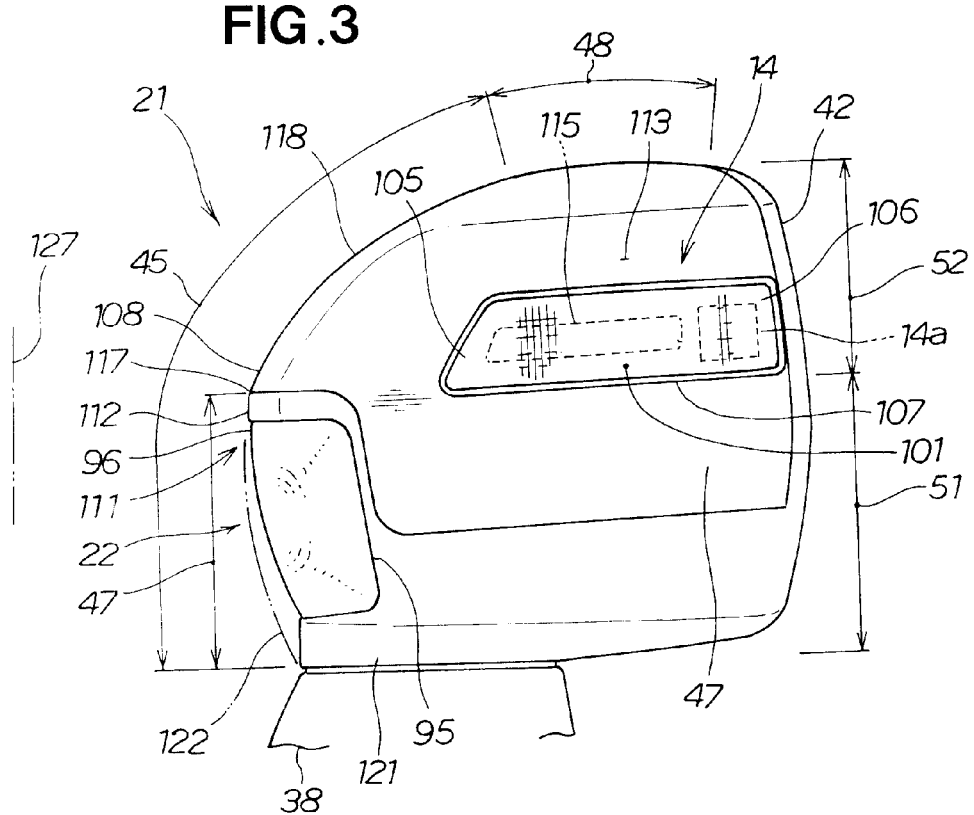
FIG. 3 is a view of the mirror as seen in the direction of arrow 3 of FIG. 2.

The lens bottom end part (the bottom end part) 107 of the blinker 14 is positioned higher than the top end part 96 of the first reflection mirror 22, as shown in FIG. 3.

The blinker 14 comprises a light-guiding plate 115 which diminishes the amount of light when light passes through, as shown in FIGS. 3 and 6.

The blinker 14 comprises the light source 14a and the light-guiding plate 115 as shown in FIGS. 3 and 6. The light source 14a is disposed in an outside end part 14b of the blinker 14. The light-guiding plate 115 is disposed so as to extend from the position where the light source 14a is disposed toward the inside (the lens inside end part 105). The light-guiding plate 115 guides light from the light source 14a and emits light toward the lens 101, and the directivity of the light is therefore improved.

The first reflection mirror 22 is a convex mirror bus is disposed so that the peak of its center is deeper in than the outer edge of the recess 111.

Figure 4:
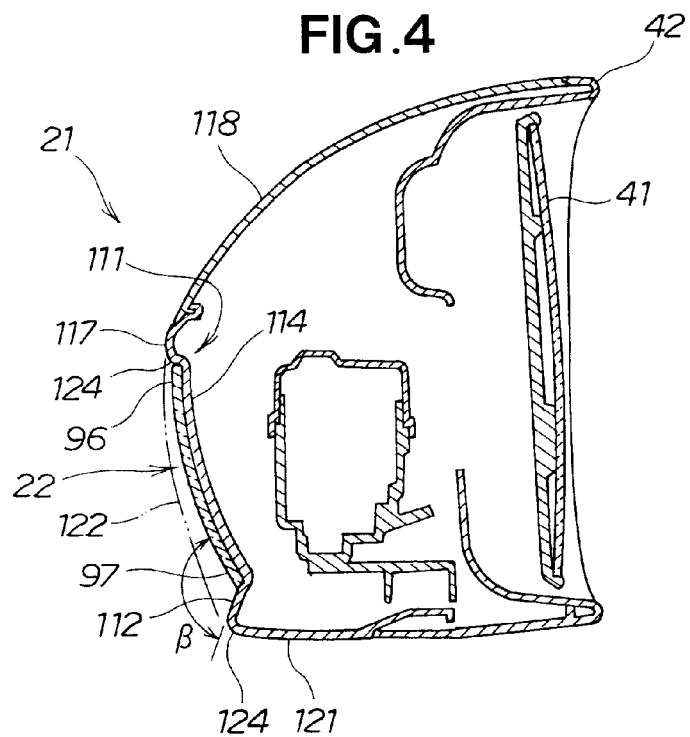
FIG. 4 is a cross-sectional view taken along line 4-4 of FIG. 2.
Figure 7:
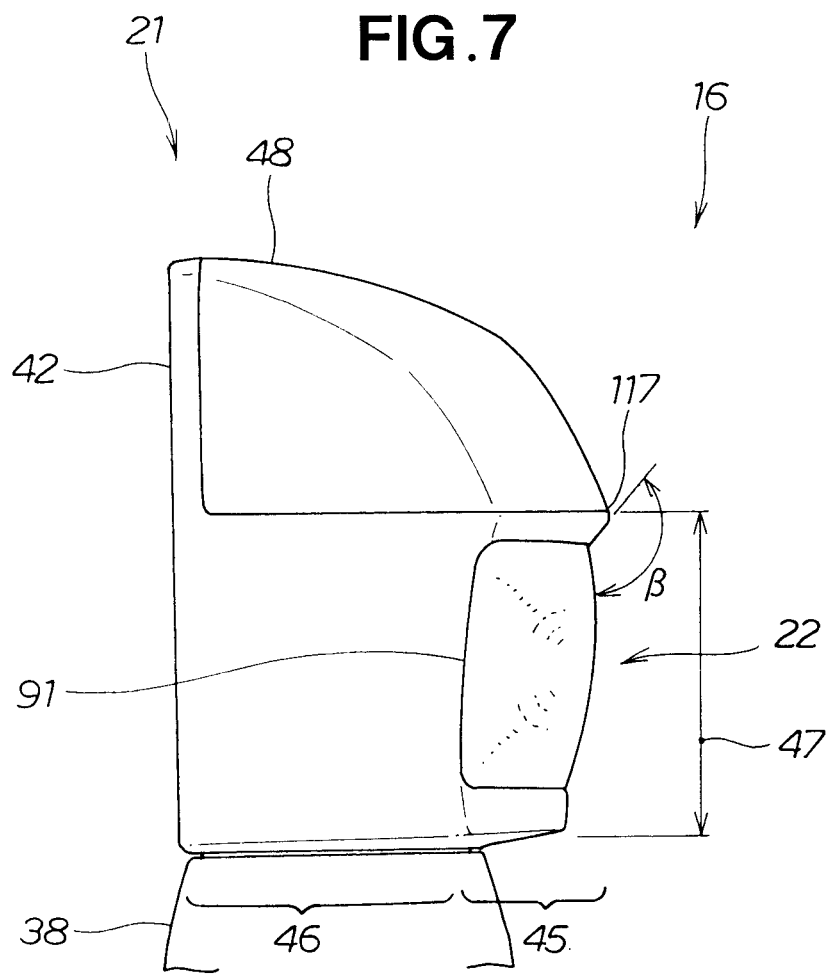
FIG. 7 is a view of the mirror as seen in the direction of arrow 7 of FIG. 2.

The recess 111 is formed at a depth where the first reflection mirror 22 is positioned farther to the rear of the vehicle than a vertical center peak 117 of the mirror housing 42, i.e. at a depth where it does not protrude out past the center peak 117, as shown in FIGS. 3 and 4. The recess 111 has the tapered wall part 112 and a recessed bottom part 114 formed in a curve as an extension of the tapered wall part 112. The first reflection mirror 22 is attached so as to be in contact with the recessed bottom part 114. The first reflection mirror 22 may be attached to the recessed bottom part 114 by adhering the first reflection mirror 22 to the recessed bottom part 114, or by fitting the top end part 96 or another end of the first reflection mirror 22 together with the tapered wall part 112.

The center peak 117 of the mirror housing 42 faces toward the front area of the vehicle 12. The mirror housing 42 has a top curved part 118 formed so as to curve from the center peak 117 to the upper side part 48, and a bottom curved part 122 formed so as to curve from the center peak 117 to a bottom part 121. The first reflection mirror 22 is provided in the bottom curved part 122. The center peak 117 extends substantially horizontally as a continuation from the front surface part 45 to the outer side part 47.

The mirror housing 42 has the inner side part 46 which faces the glass and sub window glass 34 of the left front door 28, the front surface part 45 which includes the front surface 108 and the center peak 117, and the outer side part 47 which is formed so as to continue from the front surface part 45. Furthermore, the mirror housing 42 is formed into a curved shape which includes the center peak 117.

The tapered wall part 112 of the recess 111 has a chamfered part 124 formed in the edge as shown in FIG. 4.

The first reflection mirror 22 is substantially parallel to the blinker 14 and is provided to the mirror housing 42 as being separated by a predetermined distance E from the front surface part 45 of the mirror housing 42 toward the rear area of the vehicle 12, as shown in FIG. 5.

Next, the action of the front-lateral area viewing device 16 according to the first embodiment will be described in FIGS. 8 and 9. Other drawings are used as necessary. The conditions here are such that a first target object 71 and a second target object 72 are disposed in the lateral area and below the left front of the vehicle 12, i.e., disposed in proximity to a left front wheel 68. There is a distance J from the front fender 13 of the vehicle 12 to the first target object 71 and the second target object 72, and a distance J1 from the vehicle 12 to a white line 74. The body type of the vehicle occupant Sm is standard.

The front-lateral area viewing device 16 enables a vehicle occupant Sm sitting in the seat of the driver seat 27 to see target objects in a blind spot area through the second reflection mirror 23, because when the vehicle occupant Sm looks to the left front (in the direction of arrow a4) at the second reflection mirror 23, light reflected from the first target object 71 and the second target object 72 in the blind spot reaches the occupants eyes.

Specifically, images of the first target object 71 and second target object 72 are reflected in the first reflection mirror 22, reflected light from the first reflection mirror 22 reaches the second reflection mirror 23, and images reflected by the second reflection mirror 23 reach the occupant's eyes; therefore, what is in the blind spot can be seen as shown in FIG. 8, and the blind spot area can be viewed.

With the viewing device 16, when the first reflection mirror 22 is disposed in the concave recess 111 of the mirror housing 42 as shown in FIGS. 2 through 6, the first reflection mirror 22 is embedded farther to the inside tan the surface of the front surface part 45 of the mirror housing 42, and it is difficult for light from the periphery of the door mirror 21 to reach the first reflection mirror 22. Therefore, it is possible to suppress the reflection of light from the periphery of the door mirror 21 to the vehicle occupant (the driver) Sm.

Furthermore, when the first reflection mirror 22 is disposed in the concave recess 111 of the mirror housing 42 as shown in FIG. 3, when the door mirror 21 comes in contact with an obstacle 127, the mirror housing 42 comes in contact with the obstacle 127 before the first reflection mirror 22. Therefore, the surface of the first reflection mirror 22 can be protected.

Furthermore, when the first reflection mirror 22 is disposed in the concave recess 111, of the mirror housing 42, the light of the blinker 14 provided to the mirror housing 42 does not reach the first reflection mirror 22. Therefore, it is possible to suppress the reflection of the blinker 14 of the door mirror 21 to the vehicle occupant (the driver) Sm.

When light from the mirror housing 42 strikes the tapered wall part 112 of the recess 111, the tapered wall part 112 causes the light to be reflected the light away from the first reflection mirror 22 and not towards the first reflection mirror 22, and the recess 111 and tapered wall part 112 are therefore not reflected in the first reflection mirror 22.

In the viewing device 16 as shown in FIG. 5, since the lens inside end part 105 of the blinker 14 is disposed separate from the outside end part 95 of the first reflection mirror 22 and the first reflection mirror 22 is provided as being withdrawn toward the rear of the vehicle 12 by a distance E from the normal line of the lens inside end part 105 of the blinker 14, it is difficult for the light of the blinker 14 to reach the first reflection mirror 22, and the light of the blinker 14 can be prevented from entering the first reflection mirror 22. In other words, even when the blinker 14 is actuated, the same image as the image when the blinker is not actuated can be ensured.

When the viewing device 16 is provided with the light-guiding plate 115 as shown in FIGS. 3 and 6, the directivity of the light of the blinker 14 is improved and the luminance is reduced; therefore, even if the light of the blinker 14 reflects off the wall and the light (the wall) is reflected in the first reflection mirror 22 while the vehicle 12 has stopped adjacent to the wall of a passageway, the light passing through the light-guiding plate 115 is dim and therefore less troublesome.

When the first reflection mirror 22 is provided to the bottom curved part 122 of the front surface part 45 of the mirror housing 42 as shown in FIGS. 3 and 4, even if light of oncoming vehicle headlights or the like is incident on the first reflection mirror 22, little of the incident light is directed from the first reflection mirror 22 to the second reflection mirror 23, and the light of oncoming vehicle headlights or the like can be suppressed from reaching the occupant's eyes. In other words, even if the occupant looks at the second reflection mirror 23, the second reflection mirror 23 reflects little of the light from oncoming vehicle headlights, and the glare from oncoming vehicle headlights can be suppressed.

Second Embodiment

Figure 10:
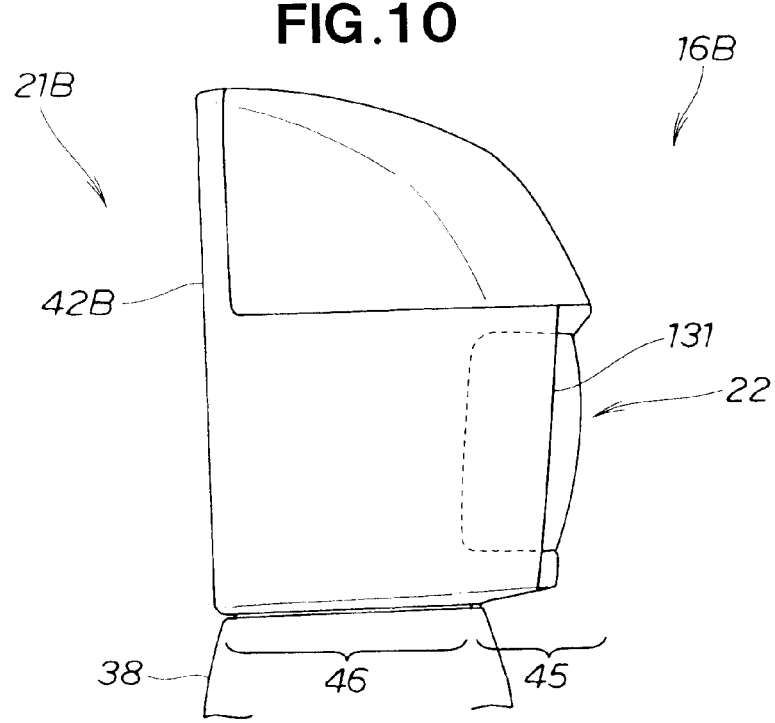
FIG. 10 is a side elevational view illustrating a door mirror of a front-lateral area viewing device according to a second embodiment of the present invention.
Figure 11:
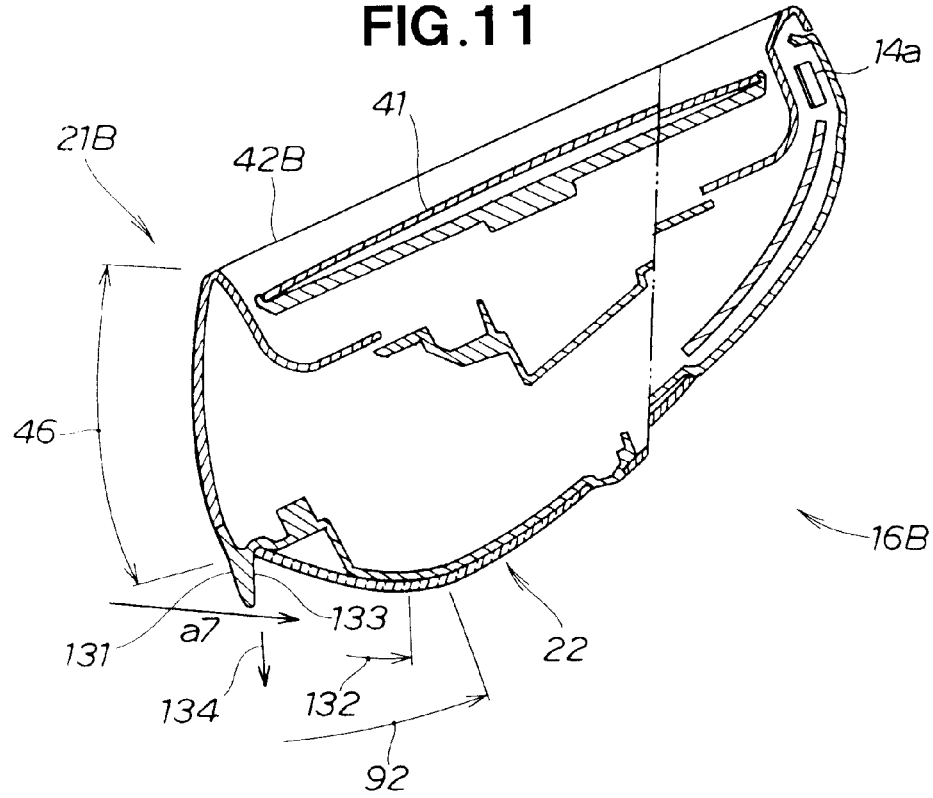
FIG. 11 is a cross-sectional view illustrating the door mirror of FIG. 10.

Next, the front-lateral area viewing device 16B according to the second embodiment will be described based on FIGS. 10 and 11. Structural elements similar to those of the first embodiment shown in FIGS. 1 through 9 above are denoted by the same symbols and are not described.

The front-lateral area viewing device 16B according to the second embodiment comprises a mirror housing 42B designed so that when the occupant directs their line of sight to the door mirror 21B, the first reflection mirror 22 does not enter the driver's vision. The mirror housing 42B has a housing shielding part 131 which is formed so as to continue from the inner side part 46 positioned in proximity to the glass or sub window glass 34 of the left front door 28, and also continue from the tapered wall part 112 of the recess 111.

The housing shielding part 131, which is positioned near the outer surface of the glass or sub window glass 34 of the left front door 28, is a dividing wall that blocks the area 132 of the forward mirror part 92 of the first reflection mirror 22 that lies in the field of vision of the vehicle occupant (the driver) Sm, and is made to protrude toward the front of the vehicle. A rear surface 133 of the housing shielding part 131 which faces the first reflection mirror 22 is formed at an angle that does not interfere with the light 134 directed to the second reflection mirror 23.

The front-lateral area viewing device 16B according to the second embodiment exhibits the same actions and effects as the front-lateral area viewing device 16 according to the first embodiment.

In the front-lateral area viewing device 16B according to the second embodiment, even when the vehicle occupant (the driver) Sm directs their line of sight to the door mirror 21B or the second reflection mirror 23 as in FIG. 1, the first reflection mirror 22 is blocked as shown by arrow a7 by the housing shielding part 131 of the mirror housing 42B. As a result, the three members, i.e. the mirror body 41, the first reflection mirror 22, and the second reflection mirror 23, are not visible at the same time, which is less troublesome, and misconceptions can be prevented.

Third Embodiment

Next, a front-lateral area viewing device 16C according to the third embodiment will be described. Members and elements similar to those of the first embodiment are denoted by the same reference numerals and are not described.

Figure 12:
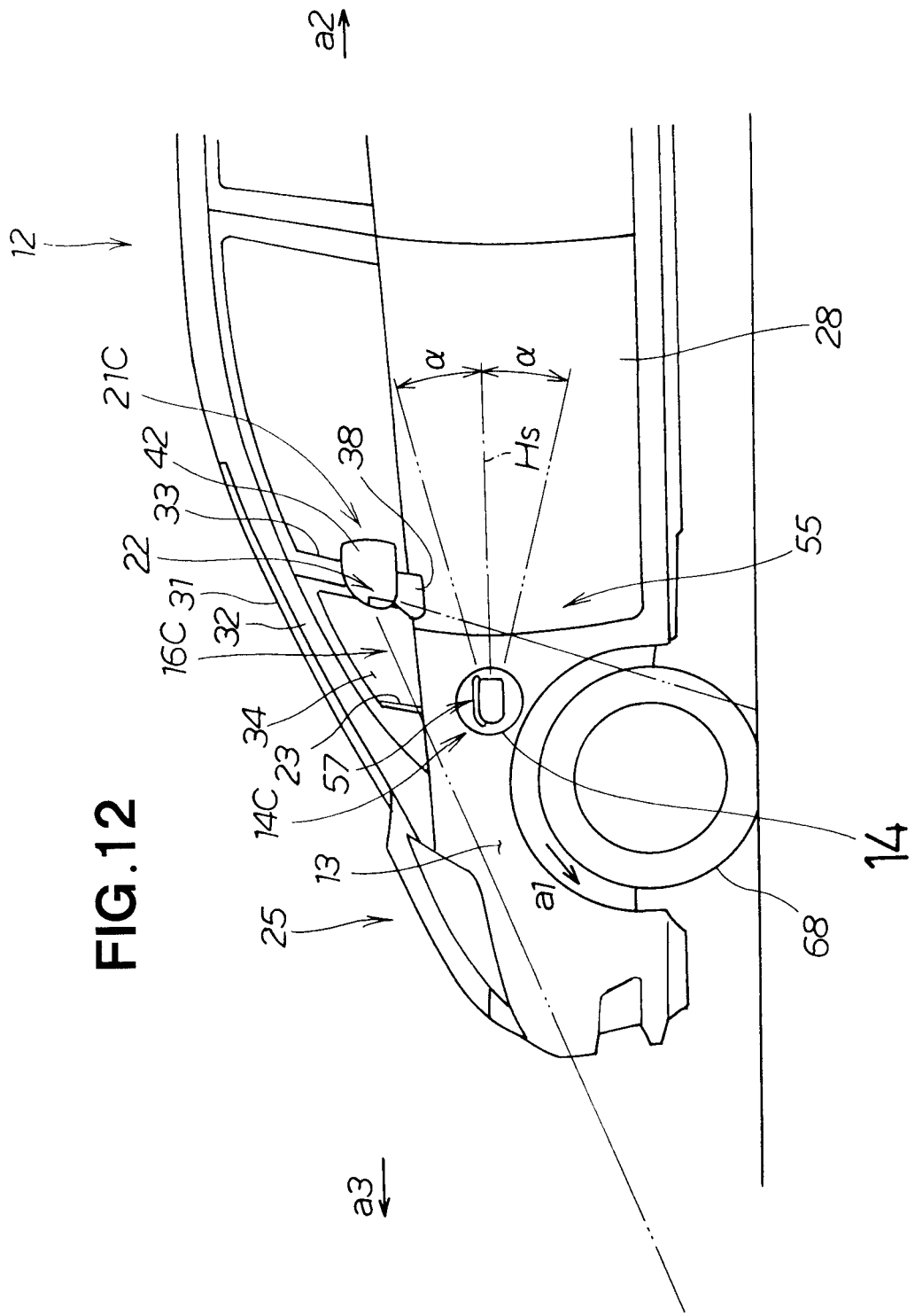
FIG. 12 is a side elevational view showing part of a vehicle employing a front-lateral area viewing device according to a third embodiment of the present invention.
Figure 13:
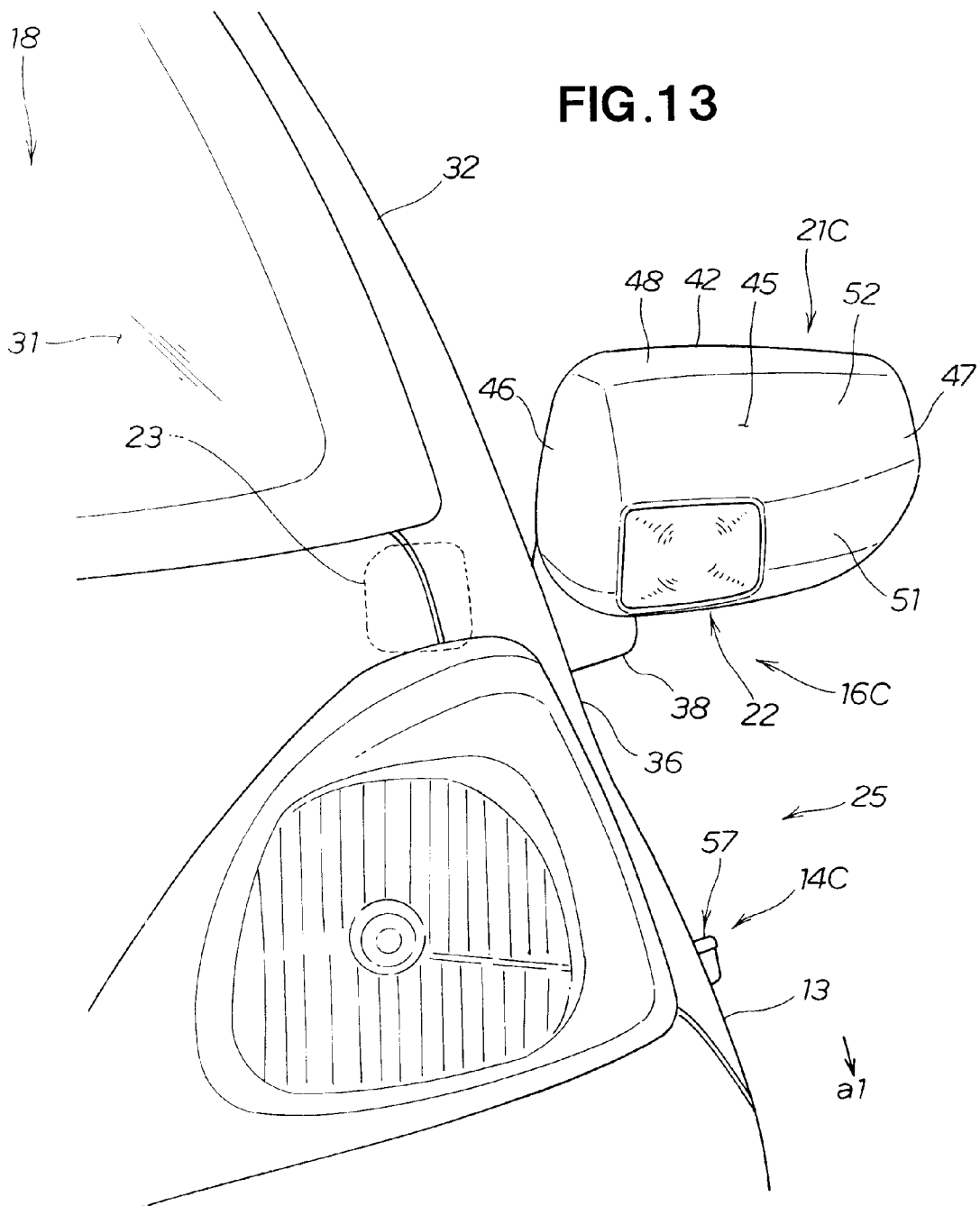
FIG. 13 is a front elevational view showing a door mirror of FIG. 12.

A blinker 14C according to the third embodiment is provided to the housing shielding part 131 constituting part of the side portion 55 of the vehicle body as shown in FIGS. 12 and 13. In the front-lateral area viewing device 16C, images reflected in the first reflection mirror 22 provided to a door mirror 21C outside of the passenger compartment 18 (FIG. 1) are reflected in the second reflection mirror 23 inside the passenger compartment 18.

The door mirror 21C according to the third embodiment is disposed in a door (the left front door 28) of the vehicle 12, farther to the rear of the vehicle 12 than the front pillar 32, as shown in FIGS. 12 through 16. The front fender 13 is disposed so as to continue downward from the front pillar 32. The blinker 14C is provided to the front fender 13. The side portion 55 of the vehicle body includes the front fender 13. The first reflection mirror 22, which is provided to the door mirror 21C, reflects a desired range from a front area of the side portion 55 of the vehicle body (the front area visible limit position 56 in FIG. 17) to a lateral area (the lateral area visible limit position 53). The second reflection mirror 23 reflects light from the first reflection mirror 22 to the vehicle occupant (the driver) Sm. The blinker 14C is provided in the front fender 13, to a location (e.g. a skirt portion 81 of FIG. 18) that blocks light directed to the first reflection mirror 22, for example.

The "location that blocks light directed to the first reflection mirror 22" may also be shielding means 57 of the blinker 14C, formed integrally in the front fender 13.

Of the light of the blinker 14C disposed within a range reflected in the first reflection mirror 22, the shielding means 57 blocks the light directed to the first reflection mirror 22.

Figure 14:
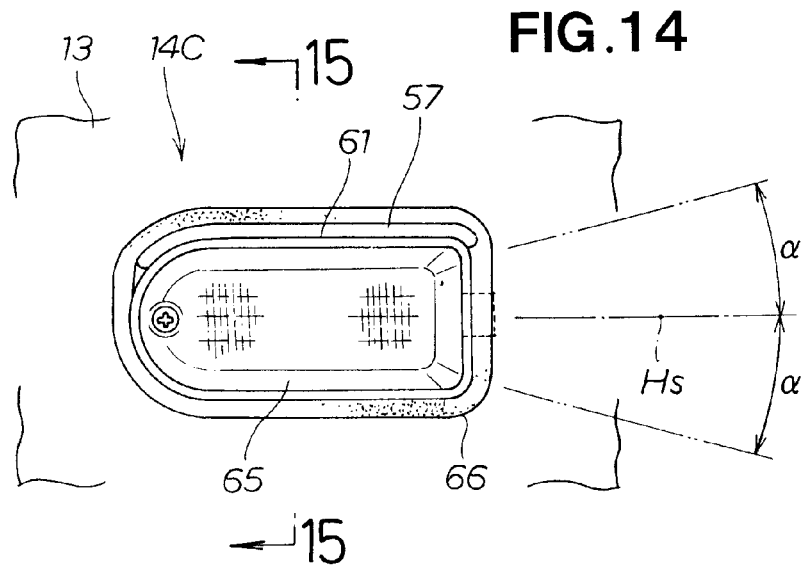
FIG. 14 is an enlarged view of area 14 of FIG. 12.
Figure 15:
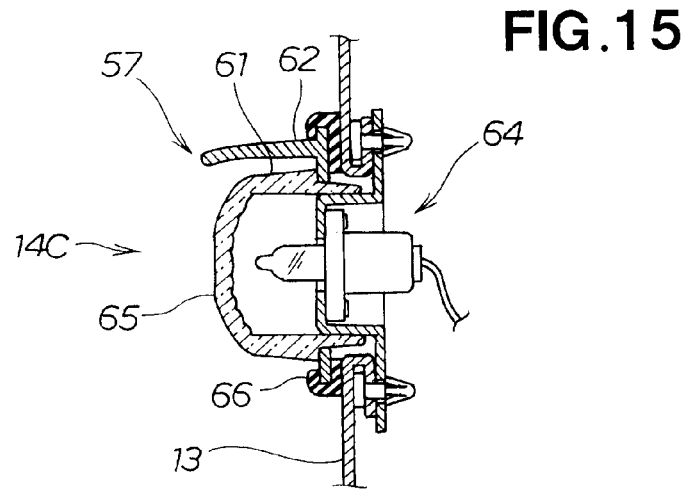
FIG. 15 is a cross-sectional view taken along line 15-15 of FIG. 14.
Figure 16:
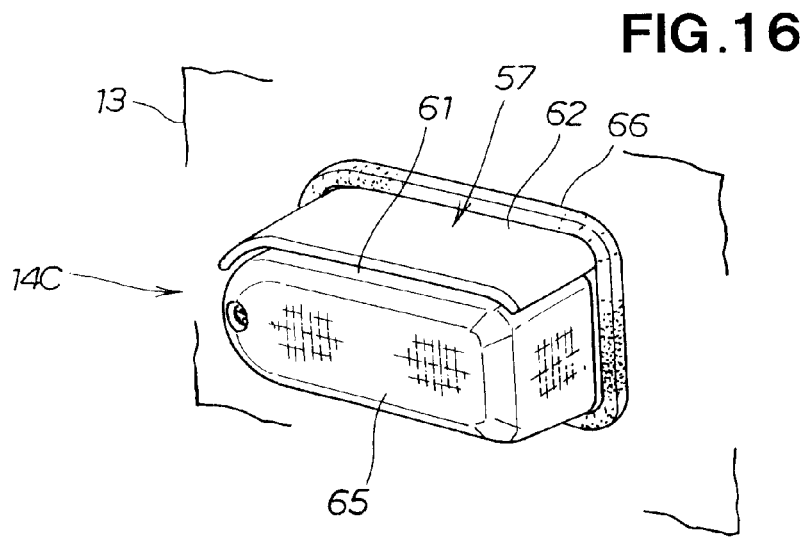
FIG. 16 is a perspective view showing a blinker of FIG. 14.

The shielding means 57, which extends along the blinker 14C between the first reflection mirror 22 and the blinker 14C, is a light-blocking plate which blocks light directed from the blinker 14C to the first reflection mirror 22. Specifically, the shielding means 57 extends along the top portion 61 of the blinker 14C and covers the entire surface of the top portion 61, as shown in FIGS. 14 and 15. A fixed end 62 of the shielding means 57 is attached to at least one of the front fender 13 and the blinker 14C.

The material of the shielding means (the light-blocking plate) 57, which is arbitrary, is either equivalent to the material of the front fender 13 or is composed of a resin that does not transmit light, for example. The fixed end 62 has a ring-shaped plate, and this ring-shaped plate is fixed to the front fender 13, but it need not be a ring-shaped plate.

The blinker 14C has a radiation angle $\alpha$ of radiating light within a range of 15° upward and 15° downward relative to a horizontal line Hs along the left front door 28, and the shielding means 57 is disposed in a position which does not interfere with the radiation angle $\alpha$. The term "relative to a horizontal line Hs" is based on the vehicle 12 being in a state of standing horizontal (the state in FIG. 12). The blinker 14C also comprises a light-emitting member 64 attached in the opening of the front fender 13, a lens 65, and a seal member 66.

Figure 17:
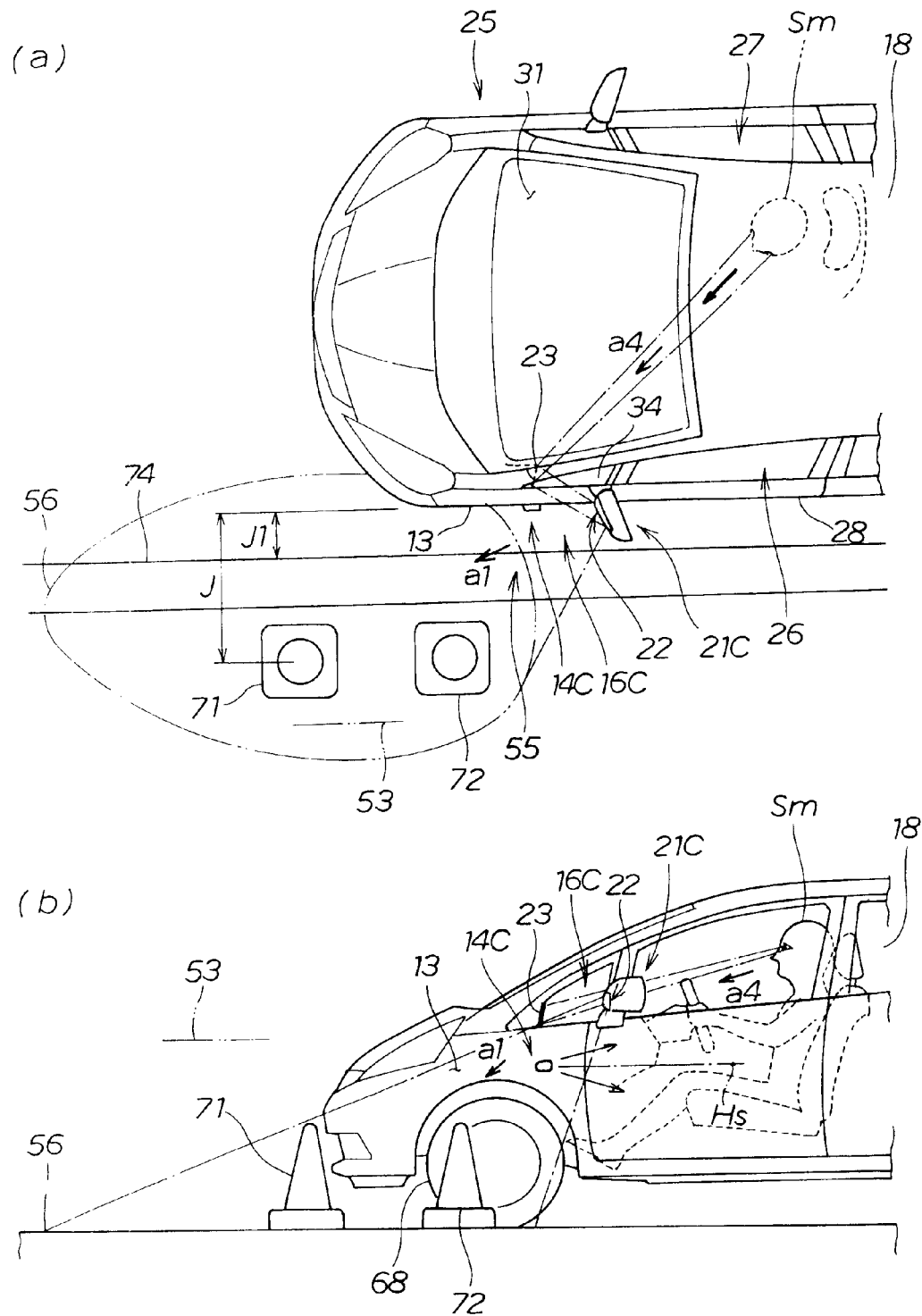
FIG. 17 is a view showing how a front-lateral area of the vehicle is reflected with the front-lateral area viewing device according to the third embodiment.

Next, the action of the front-lateral area viewing device 16 according to the third embodiment will be described in FIG. 17 while referring to FIG. 9.

The first target object 71 and the second target object 72 are positioned in the lateral area and below the left front of the vehicle 12, i.e., in proximity to a left front wheel 68. There is a distance J from the front fender 13 of the vehicle 12 to the first target object 71 and the second target object 72, and a distance J1 from the vehicle 12 to a white line 74. The body type of the vehicle occupant Sm is standard.

In the front-lateral area viewing device 16C, when the vehicle occupant Sm sitting in the seat of the driver seat 27 faces toward the left front (in the direction of arrow a4) and looks at the second reflection mirror 23, the vehicle occupant sees reflected light from the first target object 71 and the second target object 72 which are in the blind spot of the line of side, and the driver Sm can therefore view the area in the blind spot through the second reflection mirror 23.

Figure 9:
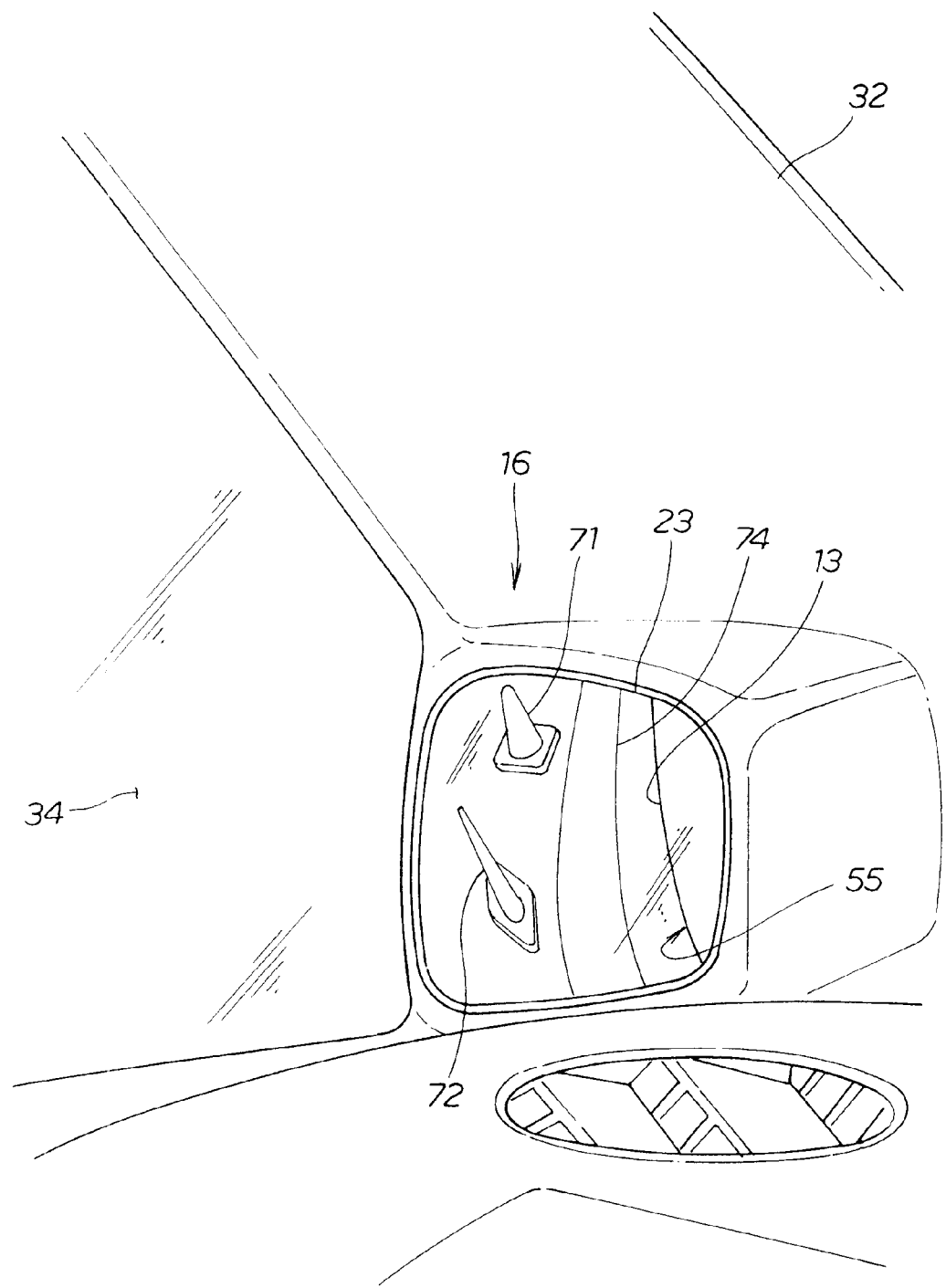
FIG. 9 is an enlarged view of the reflected front-lateral area as seen in the direction of arrow 9 of FIG. 8(a)

Specifically, reflected light from the first target object 71 and second target object 72 is light reflected by the first reflection mirror 22, reflected light of the first reflection mirror 22 reaches the second reflection mirror 23, and light reflected by the second reflection mirror 23 reaches the eyes of the driver; therefore, what is in the blind spot can be seen as in FIG. 9, and the blind spot range can be viewed.

When the blinker 14C emits light, the emitted light is blocked by the light-blocking region (e.g. the shielding means 57) provided to the front fender 13, and the light therefore is not directed to the first reflection mirror 22 of the door mirror 21C. As a result, when the side portion 55 of the vehicle body (primarily the front fender 13) and the desired range from the front area to the lateral area of the side portion 55 of the vehicle body are reflected in the second reflection mirror 23, light from the blinker 14C is not reflected. Therefore, visibility of the desired range from the front area to the lateral area of the vehicle 12 is improved.

The light emitted by the blinker 14C is blocked by the region of the front fender 13 that blocks light (the region where the shielding means 57 is provided); therefore, there is no need for a member that blocks the light of the blinker 14C, the number of components can be reduced, and the structure is simplified.

The light of the blinker 14C not blocked by the light-blocking region is radiated from the blinker 14C in all directions, and information can therefore be transmitted to other vehicles.

Since the blinker 14C a radiation angle $\alpha$ in which light is radiated within a range of 15° upward and 15° downward relative to a horizontal line Hs along the left front door 28, and the shielding means 57 is disposed in a position which does not interfere with the radiation angle $\alpha$, the light of the blinker 14C (information) can be confirmed from the rear lateral area of the vehicle 12 when the blinker 14C turns on and off even though the shielding means 57 is provided.

Fourth Embodiment

Figure 18:
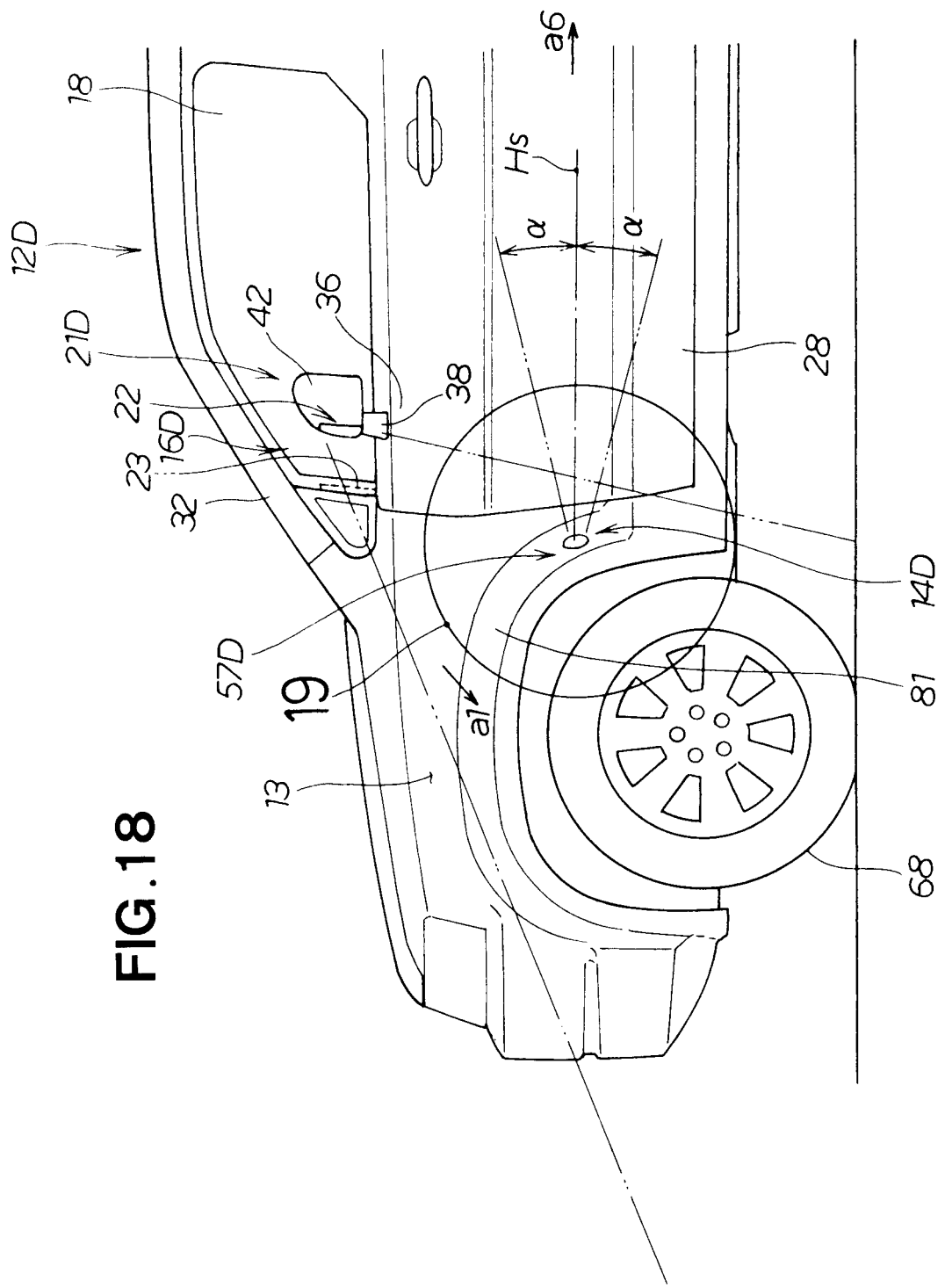
FIG. 18 is a side view showing part of a vehicle employing the front-lateral area viewing device according to a fourth embodiment of the present invention.
Figure 19:
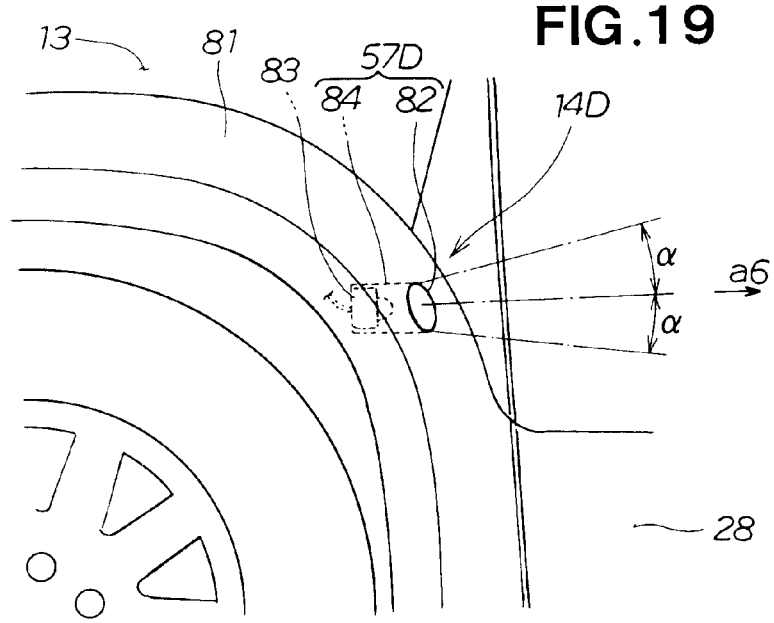
FIG. 19 is an enlarged view of area 19 of FIG. 18.
Figure 20:
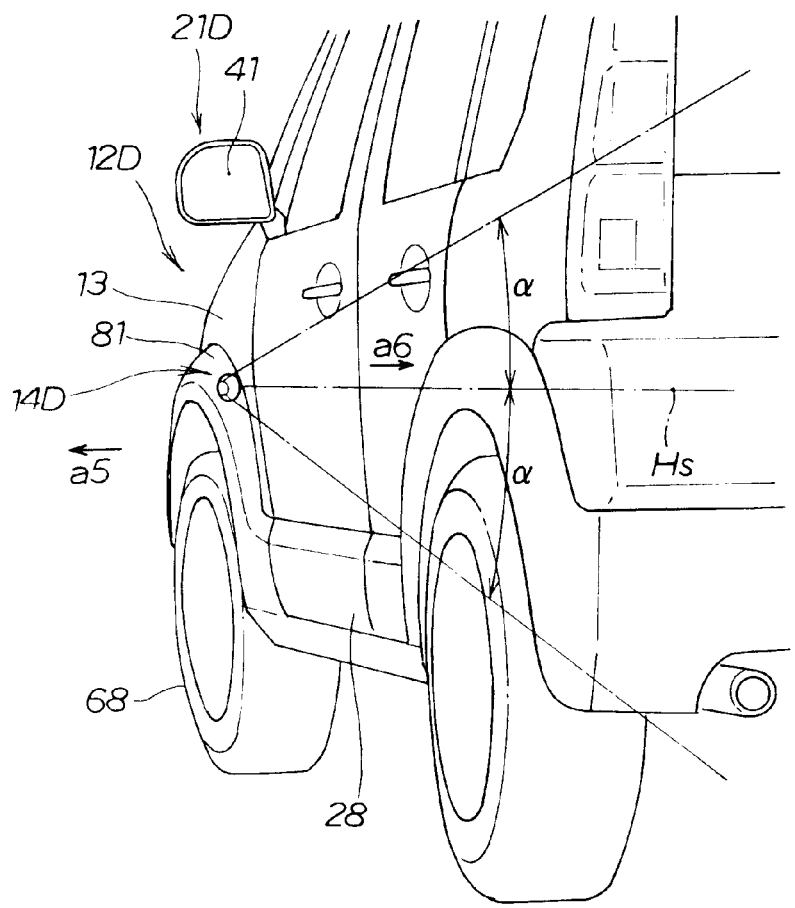
FIG. 20 is a view showing how information is transmitted to following vehicles by a blinker according to the fourth embodiment.

Next, a blinker 14D according to the fourth embodiment is described in FIGS. 18 through 20. Components similar to those of the first embodiment are denoted by the same symbols and are not described.

The blinker 14D according to the fourth embodiment is provided to the front fender 13, in the region that blocks light directed to the first reflection mirror 22 (the skirt portion 81). The skirt portion 81, which is a region that blocks light, is a region protruding in an arch shape toward the outside of the 12d (in the direction of arrow a5 in FIG. 20) along the left front wheel 68. In the skirt portion 81, the location where the blinker 14D is provided constitutes shielding means 57D.

The shielding means 57D, as shown in FIG. 19, is composed of an open portion 82 which opens toward the rear of the vehicle 12D in the front fender 13, and support means (light-emitting member support means) 84 which faces toward the open portion 82, which is disposed on the inner side of the front fender 13, and which supports the head drive mechanism 83 of the blinker 14D.

The blinker 14D has a radiation angle $\alpha$ of radiating light within a range of 15° upward and 15° downward relative to a horizontal line Hs along the left front door 28. The shielding means 57D is disposed in a position which does not interfere with the radiation angle $\alpha$.

The front-lateral area viewing device 16D according to the fourth embodiment exhibits the same effects as the front-lateral area viewing device 16C according to the third embodiment. In other words, light from the blinker 14D is not reflected in the first reflection mirror 22 (FIG. 13).

Additionally, as shown in FIG. 18, when the blinker 14D emits light, the emitted light is radiated toward the rear of the vehicle 12D (in the direction of arrow a6) as shown in FIG. 20 by the open portion 82 shown in FIG. 19, and the emitted light is radiated within a range of 15° upward and 15° downward relative to a horizontal line Hs along the left front door 28. Therefore, the light of the blinker 14D (information) can be confirmed from the rear lateral area of the vehicle 12D.

Fifth Embodiment

Figure 21:
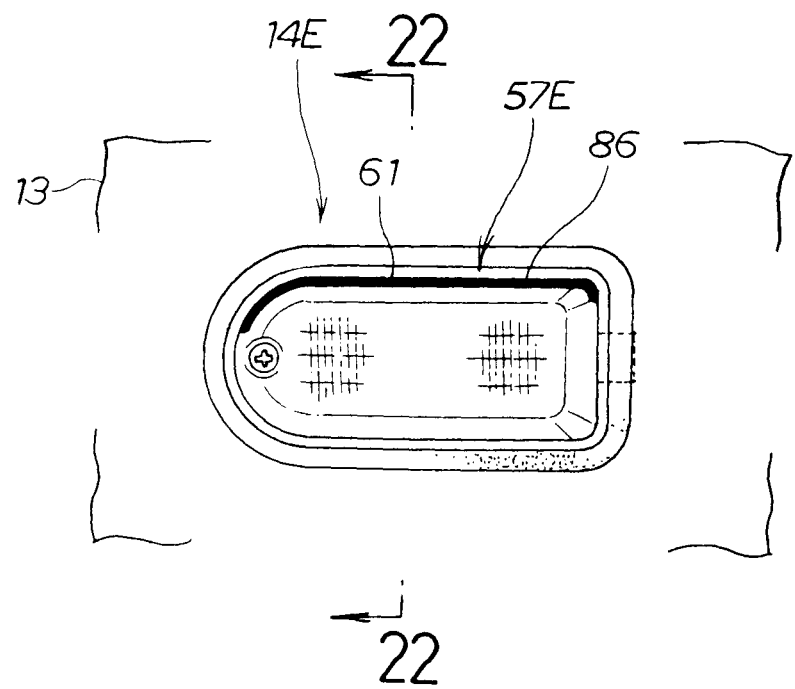
FIG. 21 is a view showing a blinker according to a fifth embodiment of the present invention.
Figure 22:
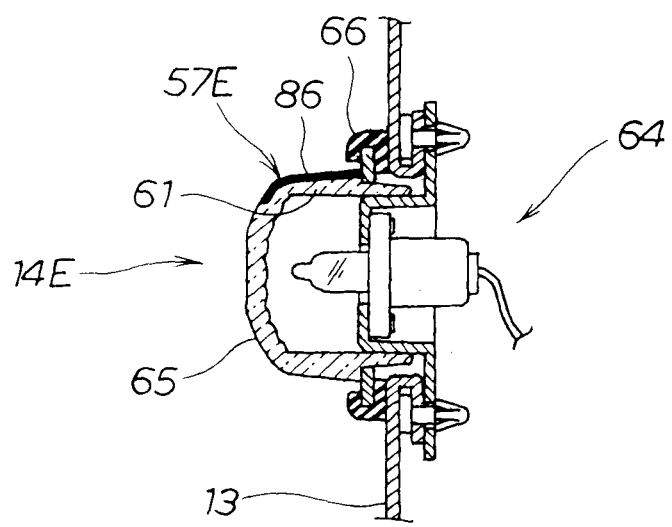
FIG. 22 is a cross-sectional view taken along line 22-22 of FIG. 21.

Next, the fifth embodiment will be described based on FIGS. 21 and 22. Members and elements similar to those of the third embodiment are denoted by the same reference numerals and are not described.

A shielding means 57E in the fifth embodiment is a light-blocking film 86 provided to the lens 65 of a blinker 14E. The light-blocking film 86 is provided to the top portion 61 of the blinker 14E, and the film blocks light directed toward the first reflection mirror 22 shown in FIG. 13.

The fifth embodiment exhibits the same effects as the third embodiment. In other words, light emitted from the blinker 14E is not reflected in the first reflection mirror 22.

The front-lateral area viewing device of the present invention represents an example used in a vehicle in the embodiments, but it can be used in other things besides vehicles as well. For example, it can be used in road markers, aircrafts, and other things having signals that use light and viewing devices.

INDUSTRIAL APPLICABILITY

The front-lateral area viewing device of a vehicle is suitable for a vehicle comprising a mirror for viewing the periphery of a front wheel.

REFERENCE SIGNS LIST

13 Front fender
14 Blinker
14a Light source
14b End portion of blinker
16 Front-lateral area viewing device
21 Door mirror
22 First reflection mirror
23 Second reflection mirror
28 Door (left side door)
32 Front pillar
41 Mirror body
42 Mirror housing
48 Top side portion
55 Side portion of the vehicle body
57 Shielding means
95 Outside end of first reflection mirror
96 Top end of first reflection mirror
105 Inside end of blinker (lens inside end)
107 Bottom end of blinker (lens bottom end)

108 Front surface of door mirror housing
111 Recess
112 Tapered wall part
113 Outside surface of door mirror housing
115 Light-guiding plate
117 Center distal end
118 Top curved portion
121 Bottom portion
122 Bottom curved portion
Hs Horizontal line
Sm Vehicle occupant (driver)
α Radiation angle

The invention claimed is:

1. A device for viewing a front-lateral area of a vehicle, comprising:
   a door mirror attached to a door forming part of a side portion of a vehicle body;
   a first reflection mirror, provided to the door mirror, for reflecting a desired range from a front area to a lateral area with respect to a side portion of the vehicle body; and
   a second reflection mirror for reflecting light from the first reflection mirror toward a vehicle occupant,
   characterized in that the door mirror has a mirror body and a mirror housing for accommodating and holding the mirror body, and the mirror housing has a recess which is inwardly recessed, the first reflection mirror being provided in the recess and disposed so as to be deeper in than an outer edge of the recess.

2. The front-lateral area viewing device of claim 1, wherein the recess has a tapered wall part formed so as to widen in the direction in which the first reflection mirror reflects the desired range.

3. The front-lateral area viewing device of claim 1, wherein the door mirror has a blinker, the blinker is disposed so that an inside end of the blinker is positioned farther to the outside than an outside end of the first reflection mirror, and the blinker extends from a front surface to an outside surface of the mirror housing.

4. The front-lateral area viewing device according to claim 2, wherein the tapered wall part has a chamfered portion formed in an edge.

5. The front-lateral area viewing device of claim 3, wherein the blinker has a light-guiding plate which diminishes the amount of light when light passes through.

6. The front-lateral area viewing device of claim 5, wherein the blinker has a light source and the light-guiding plate, the light source is disposed in an end portion of the blinker, and the light-guiding plate is disposed so as to extend from the position where the light source is disposed toward an inner side of the mirror housing.

7. The front-lateral area viewing device of claim 1, wherein the first reflection mirror is a convex mirror, and the recess is formed with a depth such that the first reflection mirror is positioned farther to the rear of the vehicle than a front end of the mirror housing.

8. The front-lateral area viewing device of claim 1, wherein the mirror housing has a top curved portion formed to be curved from a center distal end to a top side portion and a bottom curved portion formed to be curved from the center distal end to a bottom portion, and the first reflection mirror is provided to the bottom curved portion.

9. The front-lateral area viewing device of claim 1, wherein the mirror housing has a center peak positioned farthest toward the front of the vehicle in a vertical center and a bottom curved portion formed so as to curve from the center peak to a bottom portion, and the first reflection mirror is provided to the bottom curved portion.

10. The front-lateral area viewing device of claim 1, wherein the door mirror has a blinker, the blinker is disposed so that a bottom end of the blinker is positioned higher than a top end of the first reflection mirror, and the blinker extends from a front surface to an outside surface of the mirror housing.

11. The front-lateral area viewing device of claim 10, wherein the blinker has a light-guiding plate which diminishes the amount of light when light passes through.

12. The front-lateral area viewing device of claim 11, wherein the blinker has a light source and the light-guiding plate, the light source is disposed in an end portion of the blinker, and the light-guiding plate is disposed so as to extend from the position where the light source is disposed toward an inner side of the mirror housing.

13. A device for viewing a front-lateral area of a vehicle, comprising:
   a door mirror, attached to a door, for forming part of a side portion of a vehicle body;
   a first reflection mirror, provided to the door mirror, for reflecting a desired range from a front area to a lateral area with respect to a side portion of a vehicle body; and
   a second reflection mirror for reflecting light from the first reflection mirror toward a vehicle occupant,
   characterized in that the first reflection mirror is provided so as to reflect at least part of the side portion of the vehicle body, and
   the side portion of the vehicle body has a blinker in a region inside the range reflected in the first reflection mirror, and shielding means for shielding light that is emitted from the blinker and directed toward the first reflection mirror.

14. The front-lateral area viewing device of claim 13, wherein the blinker has a radiation angle of radiating light within a range of 15° upward and 15° downward relative to a horizontal line along the door, and the shielding means is disposed in a position which does not interfere with the radiation angle.

15. The front-lateral area viewing device of claim 13, wherein the shielding means is a light-blocking plate which extends along the blinker and which blocks light directed from the blinker toward the first reflection mirror.

16. The front-lateral area viewing device of claim 13, wherein the side portion of the vehicle body includes a front fender, and the shielding means includes: an open portion opening toward the rear of the vehicle in the front fender; and support means which connects to the open portion, is positioned in an inner side of the front fender and supports the blinker.

17. A device for viewing a front-lateral area of a vehicle, comprising:
   a door mirror attached to a door forming part of a side portion of a vehicle body;
   a first reflection mirror, provided to the door mirror, for reflecting a desired range from a front area to a lateral area with respect to a side portion of a vehicle body; and
   a second reflection mirror for reflecting light from the first reflection mirror toward a vehicle occupant,
   characterized in that the first reflection mirror is provided so as to reflect at least part of the side portion of the vehicle body, and the side portion of the vehicle body has a blinker in a region outside the range reflected in the first reflection mirror.

* * * * *